Figures 1, 2:
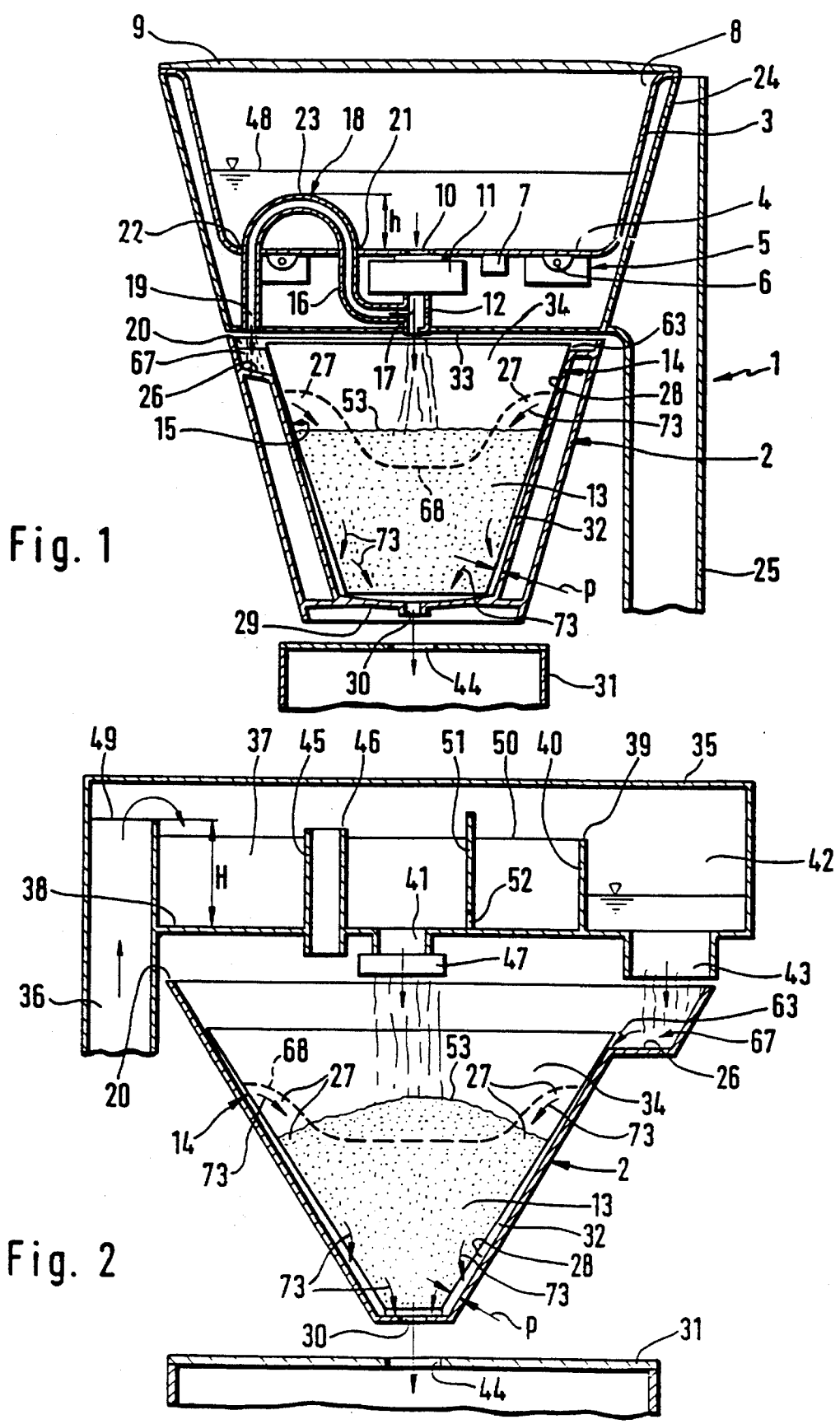

United States Patent [19]
Weller et al.

[11] Patent Number: 5,460,078
[45] Date of Patent: Oct. 24, 1995

[54] BEVERAGE BREWING MACHINE

[75] Inventors: Albrecht Weller, Steinbach; Georges Driesen, Niederhöchstadt; Andreas Peter, Kronberg; Peter Herber; Gerhard Schäfer, both of Frankfurt am Main; Stephen Schamberg, Usingen, all of Germany

[73] Assignee: Braun Atkiengesellschaft, Frankfurt, Germany

[21] Appl. No.: 204,380

[22] PCT Filed: Sep. 11, 1992

[86] PCT No.: PCT/EP92/02081

§ 371 Date: Mar. 11, 1994

§ 102(e) Date: Mar. 11, 1994

[87] PCT Pub. No.: WO93/05692

PCT Pub. Date: Apr. 1, 1993

[30] Foreign Application Priority Data

Sep. 13, 1991 [DE] Germany ............ 41 30 446.2

[51] Int. Cl.[6] ........................................ A47J 31/00
[52] U.S. Cl. .................................... 99/295; 99/306
[58] Field of Search ................. 99/300, 309, 306, 99/307, 295, 305, 302 R, 301, 279, 299, 298, 316, 317; 426/433

[56] References Cited

U.S. PATENT DOCUMENTS

| | | | |
|---|---|---|---|
| 3,793,934 | 2/1974 | Martin | 99/304 |
| 4,064,795 | 12/1977 | Ackerman | |
| 4,448,113 | 5/1984 | Brabon | 99/304 |
| 4,920,871 | 5/1990 | Anson | 99/304 |

FOREIGN PATENT DOCUMENTS

| | | |
|---|---|---|
| 711684 | 10/1941 | Germany . |
| 2821996 | 5/1978 | Germany . |
| 8227246.8 | 9/1982 | Germany . |

*Primary Examiner*—Robert W. Jenkins
*Attorney, Agent, or Firm*—Fish & Richardson

[57] ABSTRACT

A beverage brewing machine including a reservoir for holding cold water, an electric heating unit which during operation heats the cold water to produce a brewing water, and a brewing unit. The brewing unit has a receiving chamber for receiving a filter insert into which product is placed. The filter insert has a water-permeable wall. The receiving chamber has a collecting groove which receives water and delivers the received water to the outside of the water-permeable wall when the filter insert is resting in the receiving chamber so that water flows through the sidewall into an upper portion of the product in the filter insert. The reservoir includes a first water outlet through which a portion of the brewing water is delivered onto the top of the product in the filter insert, and the reservoir includes a second water outlet through which another portion of the brewing water is delivered to the collecting groove and from there through the water permeable wall of the filter insert.

9 Claims, 2 Drawing Sheets

BEVERAGE BREWING MACHINE

The present invention relates to a beverage brewing machine in which cold water can be heated by an electric heating unit and flows as brewing water onto the upper surface of a product, preferably ground coffee or tea leaves, contained in a filter insert which is permeable for the brewed beverage and, in turn, is inserted into the receiving chamber of a brewing unit, from which after extraction of the product the so prepared brewed beverage finally dispenses into a storing tank, while brewing water can propagate into the storing tank also along another path than along the upper surface of the product.

A beverage brewing machine of this kind is already known from U.S. Pat. No. 4,064,795. In this beverage brewing machine, brewing water flows along the other path directly into the storing tank without getting in contact with the product. By reducing the contact time of the brewing water with the product, it is desired to prevent undesirable coffee materials substantially from extracting from the product so that the brew dispensing in the storing tank contains undesirable solids such as bitter constitutents only to a small extent.

When brewing water in this beverage brewing machine passes into the upper surface of the product, the latter is usually bloated such that the ground coffee ascends the edge of the filter insert already at the beginning of the brewing action. When further brewing water is introduced into the product, this upper fringe area will hardly be reached by the brewing water. This effect is augmented by the brewing water generally exiting from an outlet opening that is arranged relatively centrally onto the upper surface of the product and, consequently, by the effect of gravity, the flow density of the brewing water in the fringe areas is anyway considerably less than in the middle of the product. It ensures from both effects that although the extraction of bitter constituents can be largely avoided, the product is still not made use of sufficiently.

Therefore, the object of the present invention is to provide a beverage brewing machine of the kind referred to which permits to make better use of the product in the brewing action without the portion of bitter constituents in the brew noticeably increasing.

This object is achieved by the present invention in that the filter insert is water-permeable from the outside to the inside, in that the portion of brewing water flowing along the other path is directed in the area of the upper surface of the product to the outside surface of the filter insert and, subsequently, by extracting the product finally reaches the storing tank. Owing to this inventive arrangement, also the upper area of the product is penetrated from the outside by the portion of brewing water flowing along the other path, and is additionally extracted. Since due to the split-up of the brewing water which reaches the brewing unit along two different paths the contact time of the brewing water with the product is shorter now as before, the portion of brewing water flowing along the other path through the product does not either cause extraction of any appreciable undesirable flavours from the product. Namely, without causing undesirable bitter constituents in the brew, the portion of brewing water flowing along the other path accomplishes in addition a better extraction of the product so that the resulting brew contains almost the same concentrate components as if the entire brewing water had passed along the surface of the product.

Tests have shown that if the entire brewing water (8 cups) is introduced through the upper surface of the product being ground coffee (52 gm roughly) (conventional brewing method), approximately 1.35 percentage by weight concentrate and a large portion of bitter constituents result. The brewing water being produced according to the method described in U.S. Pat. No. 4,064,795, with a bypass portion of roughly 25 percent, there result only approximately 1.15 percentage by weight concentrate in the brewed beverage, however, with small portions of bitter constituents. Once the brewed beverage is made according to the features of the present invention, there result in the brew approximately 1.33 percentage by weight concentrate, that means compared to the first variant only 0.02 percentage by weight concentrate are missing. Yet this small portion of weight is exactly that portion which makes out the bitter constituents and other undesirable side materials, that means the brew produced according to the present invention is just as strong as with the conventional brewing method, but it nevertheless contains the small portion of bitter constituents which is roughly obtained when making the brew according to the method disclosed in U.S. Pat. No. 4,064,795.

In order that the brewing water that flows along the other path into the brewing unit can be brought into contact with the product in the upper area of the filter unit as evenly as possible, it is favourable that a paper filter is used as a filter insert, that the receiving chamber of the brewing unit has a bowl-shaped configuration and has a spacer element in the area of its edge which projects into the receiving chamber of the brewing unit, the dimensions of the receiving chamber of the brewing unit being conformed to the paper filter such that, during the brewing action, the latter filter substantially abuts on the inner wall of the brewing unit, with the exception of the area of the spacer element, but that in the area of the spacer element a space is caused between the inner wall of the brewing unit and the outside surface of the paper filter, and that the brewing water directed along the other path enters through this space into the brewing unit. Namely owing to using a water-permeable paper filter and owing to said abutting at least in the upper area on the inside of the brewing unit, with the exception of the area of the spacer element from where the brewing water entering along the other path is introduced, the brewing water introduced via a different path can distribute evenly around the entire paper filter and, thus, can enter from the outside into the product in order to obtain a better extraction of the ground coffee in this outer zone, too, that means in order to extract component parts of the brewed beverage which are important for the brew. The even distribution of the brewing water portion introduced along the other path onto the upper area of the paper filter will commence properly only when the paper filter is moistened evenly and is in tight abutment on the inside of the filter unit. This is because then this distribution action will be recognized to commence due to the starting osmosis and capillary effect. That means, the better the paper filter abuts with its outside on the inside of the filter unit, the more evenly the brewing water enters from the outside via the paper filter into the product.

A particularly effective penetration of the brewing water which flows into the brewing unit along the other path through the paper filter is accomplished when both the receiving chamber of the brewing unit and the paper filter are of funnel-shaped configuration.

It is particularly advantageous that the spacer element has such a shape that it forms jointly with the inner wall of the filter unit a funnel for the brewing water which is expanded towards the inlet opening, and that the funnel contains an opening directing the brewing water to the outside of the filter insert. As a result, the brewing water entering through the upper opening of the funnel is conveyed to the outlet opening, from where it is then introduced via the outside surface inwardly into the paper filter. It is achieved by this arrangement that the brewing water flowing along the other path is preferably introduced only in the upper area onto the outside surface of the paper filter so that the brewing water gets into contact with the upper fringe area of the product.

In order to be able to introduce the brewing water entering the brewing unit along the other path into the upper area of the paper filter, it is favourable that the opening on the funnel is formed by a slot which extends along the peripheral surface of the funnel.

Further, it is possible that the spacer element is composed of a tape attached at its two ends to the inner wall of the brewing unit and forming an opening for the brewing water jointly with the inner wall of the brewing unit. In this embodiment, for instance, the spacer element can be made of sheet metal and can be fixed to the inner wall of the brewing unit. However, it is likewise possible that the spacer element, as well as the brewing unit, are made of plastics so that both parts form a one-piece shaped part.

In order that merely the upper area of the paper filter abuts particularly evenly and circumferentially on the inside of the brewing unit, it is favourable that ribs extending from the top to the bottom are provided on the inner wall along the brewing unit, the ribs' heights of profile decreasing from the bottom area of the outlet opening towards the upper edge of the inner wall of the brewing unit in such a manner that the upper area of the inner wall is of smooth design. The ribs in the bottom area of the brewing unit serve in particular to prevent an excessive suction effect of the paper filter on the inside of the brewing unit and, that the paper filter together with the product can thus be removed comparatively easily from the filter unit after the brewing action, without the paper filter being torn in doing so. In contrast thereto, the paper filter shall abut almost in close fit on the inner wall in the upper area in order to permit an even passage of the brewing water entering from the outside into the paper filter.

Two embodiments of the present invention are illustrated in the accompanying drawings and will be described in more detail in the following.

In the drawings,

FIG. 1 is a longitudinal cross-section taken through a first embodiment according to the present invention, wherein the other path for the brewing water is formed by a line with a siphon-like course, and wherein only the supply reservoir with a coffee filter of a beverage brewing machine arranged underneath is illustrated, and FIG. 2 is a longitudinal cross-section through a second embodiment of the present invention, wherein the brewing tip containing only the other path and the brewing unit of a beverage brewing machine are illustrated only schematically.

Figure 3:
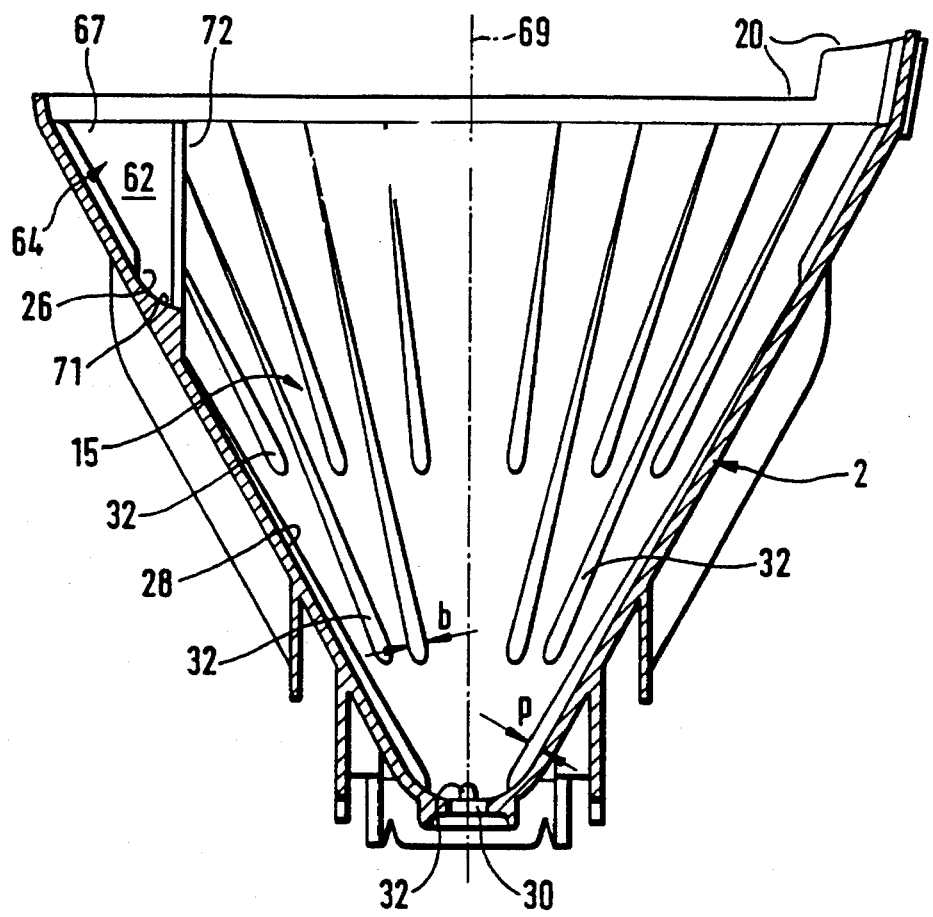
Figure 4:
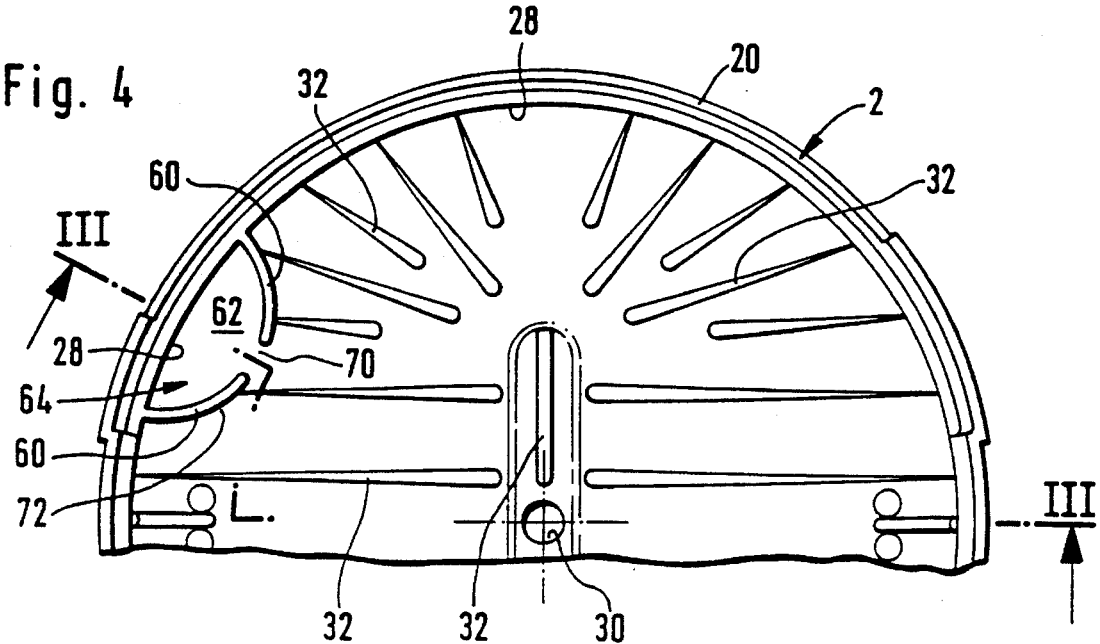

FIG. 3 is a longitudinal cross-section according to the line of intersection III—III in FIG. 4 through another embodiment of a filter unit according to the present invention, however, without filter insert, and FIG. 4 is a partial top view of the filter unit illustrated in FIG. 3, viewed from the top.

In FIG. 1 a cross-section of a beverage brewing machine 1 is illustrated which on top of a brewing unit 2 comprises a supply reservoir 3, on whose bottom 4 an electrically driven heating unit 5 is arranged. The supply reservoir 3 hence represents with the heating unit 5 an open boiler in which filled-in water can be brought to boil. The heating unit 5 is formed by a circularly extending heating spiral 6 which is supplied with electric energy when a switch of the beverage brewing machine not illustrated in the drawing is actuated.

Further, according to FIG. 1, a temperature control device 7 controlling the temperature of the water of the supply reservoir 3 is arranged on the bottom 4 outside the supply reservoir 3, which temperature control device, once the water is heated to a sufficient temperature, interrupts the electric energy supply to the heating spiral 6. The supply reservoir 3 contains a fill opening 8 which is closable by a cover 9.

Also, on the bottom 4 of the supply reservoir 3, an opening 10 is provided according to FIG. 1 which connects to an outlet valve 11 arranged beneath the bottom 4. The outlet valve 11 is formed by a thermostat valve which does not open until the water, when heated, has reached a predetermined temperature, preferably its boiling temperature. An outlet pipe 12 succeeds the outlet valve 11 and, as soon as the outlet valve 11, has assumed its open position allows the brewing water to dispense on the upper surface 53 of a product 13 introduced into the brewing unit 2. Preferably, the product 13 is ground coffee which is put into the brewing unit 2 only after a water-permeable filter insert 14, preferably a paper filter, has been inserted into the receiving chamber 15 of the brewing unit 2, which chamber tapers conically downwards.

Branching off from the outlet pipe 12 according to FIG. 1 is a line 16 which has a siphon-like course 18, that means the line 16 extends from its branch point 17 provided beneath the bottom 10 once more into the chamber of the supply reservoir tank 3, from where it returns to the bottom 4 due to its siphon-like course 18, interrupts said bottom and, with its free end 19, is directed to the upper edge 20 of the brewing unit 2. At those points where the line 16 penetrates the bottom 4, of course the line 16 must be shut off tightly against the openings 21, 22 provided on the bottom 4.

The vertex 23 of the siphon-like line 16 according to FIG. 1 is at a level h, which corresponds roughly to a quantity of water of 20 percent to 40 percent disposed in the supply reservoir 3 of the maximum capacity of water that the supply reservoir 3 can receive. When a flexible line 16 and a level-adjusting device not shown in FIG. 1 are used, the vertex 23 can be adjusted by the user to different levels h inasfar as the line 16 is sized to be sufficiently long.

According to FIG. 1, the supply reservoir 3 is embedded in a casing or, respectively, a housing 24 which is connected with a base 25. Of course, it is also possible that the siphon-like line 16 extends outside the supply reservoir 3 in the same way. If necessary, the free end 19 of the siphon-like line 16 can be provided with a valve device controlling the passage of water which is not illustrated in the drawing though.

Perpendicularly below the free end 19 according to FIGS. 1 to 4, a collecting groove 26 is shaped at the edge 20 of the brewing unit 2 which collects the brewing water exiting at the free end 19 and conveys it to the outside surface 63 of the filter insert 14 (illustrated in FIGS. 1 and 2 only), from where it enters via the water-permeable filter insert 14 into the outward upper fringe area 27 of the product 13 (shown in FIGS. 1 and 2 only) and after extraction, in about according to the illustrated arrows 73, is conveyed again via the filter insert 14 to the bottom 29 of the brewing unit 2 where it subsequently exits from the outlet opening 30 together with the brewing water, which entered at the upper surface 53 of the product 13, from where it flows into a storing tank 31 provided beneath the outlet opening 30.

The collecting groove 26 can be shaped as a locally provided indentation in the edge 20 of the brewing unit 2 as is illustrated in FIGS. 1 and 2. However, it can also be provided as an annularly extending groove which is integrated in part or entirely in the edge's inner circumference of the filter unit 2, which groove additionally, starting from the inlet, can have a gradient in the direction of the outlet opening 30. The brewing unit 2 can be attached so as to be removable from the bottom side 33 of the housing or the casing 24, respectively.

As can be taken from FIG. 1, in this embodiment the upper free end of the paper filter 14 projects beyond the collecting groove 26 in order that when brewing water flows through the line 16 it will not get into the interior 34 of the paper filter 14. However, the paper filter 14 must not project upwardly so far that water flowing on the collecting groove 26 will make the paper filter 14 collapse inwardly.

As far as the brewing units in FIGS. 2 to 4 are concerned, they correspond basically to those in FIG. 1 so that those referred to in FIGS. 2 to 4 need not be dealt with more closely. Therefore, to avoid repetitions, like reference numerals have been assigned to like parts in the brewing unit 2 in FIGS. 2 to 4.

FIG. 2 shows a brewing tip 35 which is provided on top of the brewing unit 2. Said brewing tip 35 includes a feed pipe 36 which communicates with a continuous flow heater not illustrated in the drawing. In turn, the continuous flow heater communicates with a supply reservoir not shown in the drawing which contains cold water during the brewing action. Since a coffee machine operating according to this principle has been known for long, as can be gathered from German patent application P 41 08 631.7, the preparation and the transport of brewing water up to the brewing tip 35 shall not be referred to in detail herein. Finally, the brewing water is conveyed to the feed pipe 36 at the brewing tip 35.

According to FIG. 2 the feed pipe 36 terminates into a main chamber 37 provided in the brewing tip 35, however, at a level H with respect to the bottom 38 of the main chamber 37 which is above the upper edge 39 of a partition wall 40. The partition wall 40 confines the main chamber 37 in FIG. 2 to the right and is disposed on the right of a first outlet opening 41 which is provided roughly above the middle of the brewing unit 2 so that when brewing water dispenses out of the first outlet opening 41, said water flows directly on the upper surface 53 of the product 13 disposed therebeneath.

Provided on the right hand of the partition wall 40 in FIG. 2 is a secondary chamber 42 containing a second outlet opening 43 on the bottom 38 of the brewing tip 35 which corresponds to the free end 19 of the line 16 in FIG. 1. According to FIG. 2, a pipe 45 is provided on the left hand of the first outlet opening 41 in the bottom 38, which pipe penetrates the bottom 38 downwardly towards the atmosphere and which projects into the main chamber 37 so far that it ends with its upper edge 46 above the partition wall 40. Pipe 45 serves to vent the main and the secondary chambers 37, 42. Following the first outlet opening 41 is another valve 47, by which the opening cross-section of the first outlet opening 41 can be increased, unless this has not be done already by a valve (not shown) provided at the second outlet opening 43.

As can be taken from FIGS. 1 to 4, projecting ribs 32 are provided at the inner wall 28 of the brewing unit 2 and extend from the bottom to the top along the brewing unit 2. The ribs 32 taper towards the upper edge 20 of the filter unit 2 both in the height p and in the width b such that they pass there into the inner wall 28 entirely or almost entirely, that means the inner wall 28 is of smooth design in its upper area.

Upon insertion of a paper filter 14 the ribs 32 act as spacer elements and facilitate among others the removal of the paper filter 14 after the brewing action, since in this bottom area the paper filter 14 does not abut in a very adhesive fashion on the inner wall 28 of the brewing unit 2 as this is the case in the upper area. When a large number of spacer elements 32 are used along the wall 28, the adhesion of the humid paper filter 14 on the inner wall 28 of the filter unit 2 can be reduced thereby.

The mode of effect of the beverage brewing machines according to FIGS. 1 to 4 is as follows:

When cold water is filled into the supply reservoir 3 of the beverage brewing machine 1 according to FIG. 1, the filling level whereof is indicated by the water-depth gauge, it can be recognized that the water-depth gauge 48 is above the vertex 23 of the siphon-like extending line 16. As soon as the main switch (not shown) of the beverage brewing machine 1 is actuated, the heating unit 5 will start since the temperature control device 7 is short-circuited. Now the water in the supply reservoir 3 will heat until it starts to boil, or, respectively, until the desired temperature is reached. Beginning from this point the temperature control device 7 interrupts the power supply to the heating spiral 6. Simultaneously, the outlet valve 11 will open, and brewing water discharges via the outlet pipe 12 onto the upper surface 53 of the product 13 into the brewing unit 2.

Once the water-depth gauge 48 of the brewing water is above the vertex 23 of the line 16, as is the case in FIG. 1, brewing water will also dispense through the line 16 and via the free end 19 into the collecting groove 26 of the brewing unit 2. When the cross-sections of outlet pipe 12 and line 16 have been chosen accordingly, it is ensured that a sufficient amount of pressure prevails at the inlet of the line 16 in order to let brewing water flow via the line 16. The vertex 23 is chosen to be about so high that a supply reservoir which is filled until the vertex corresponds roughly to a number of three cups.

The branch point 17 of the line 16 can be connected also directly on the bottom 4 of the supply reservoir 3 with a temperature-controlled valve of its own (not illustrated) so that the discharge of brewing water can be controlled by an own connection with valve at the supply reservoir 3 instead of by the valve 11.

The quantity of brewing water which gets into contact with the upper surface 53 of the product 13 extracts, e.g. when making coffee, the extraction materials out of the ground coffee 13 and then flows as coffee out of the outlet opening 30 of the filter unit 2 and via the inlet 44 into the storing tank 31. Simultaneously, however, brewing water— in case the water-depth gauge 48 is higher than the vertex 23 of the line 16—flows via the free end 19 of the line 16 into the collecting groove 26, from where it propagates along the other path 73 according to FIGS. 1 to 4, namely along the upper area of the outside surface 63 of the paper filter 14 (FIGS. 1 and 2) into the upper fringe area 27 of the product 13 and from there, roughly according to the direction of the arrows 73, up to the outlet opening 30. This portion of brewing water which, in the event of a water-permeable filter insert 14 shaped as a paper filter, from the outside surface 63 gets into contact with the upper fringe area 27 of the ground coffee 13 leads to make better use of the upper fringe area 27 so that one can do with a reduced quantity of ground coffee and, in addition, has less bitter constituents in the coffee. This is because there is hardly any extraction of undesirable flavour materials, since the contact times between the ground coffee 13 and the brewing water is reduced owing to the other path 73 (arrows) acting as a bypass. Namely due to the separate discharge of the brewing water out of the supply reservoir 3 a smaller portion of brewing water is introduced via the upper surface 53 of the product 13, as if the line 16 did not exist. As a result, brewing water is applied to the product 13 during a shorter period of time so that bitter constituents and other products impairing the brew are not extracted. Owing to the low brewing water level in the brewing unit at the end of the brewing action, the drip-empty time will be reduced by additional 30 to 40 seconds approximately. In addition, the extraction materials collecting in the paper of a paper filter 14 which are dissolved already from the middle out of the product 13 will be flushed out and are conveyed to the storing tank 31 which otherwise would have remained unused in the paper filter 14.

According to FIGS. 1 and 2 the upper area of the filter insert 14 abuts, if a paper filter conformed to the size of the filter insert 14—e.g. of the conventional size 1×4—is concerned, substantially with its whole surface in the upper area of the filter unit 2, but only after the paper filter 14 was moistened by the first brewing water. This is because in this event the paper filter 14 on account of the resulting adhesion forces adheres particularly well to the inside wall 28 of the filter unit 2 so that, due to the starting capillary effect, the brewing water which passes the filter unit 2 along the other path 73 (arrows) is distributed comparatively evenly over the entire periphery of the upper area of the paper filter 14. The arrows designated by the reference numeral 73 indicate in FIGS. 1 and 2 in about the course which the brewing water takes along the other path 73, starting from the outlet opening 19 (FIG. 1) or 43 (FIG. 2) because of the commencing osmosis and capillary effect.

While the upper surface 53 of the product 13 according to FIGS. 1 and 2 represents the course which results roughly after the fill-in action of the ground coffee 13, the phantom line 68 is to represent in about the surface of the product 13 which results by bloating shortly before the water delivery out of the outlet opening 19 or 43, respectively.

The higher the water-depth gauge 48 in FIG. 1 is, the greater portions of brewing water pass through the line 16 and the other path 73. This portion of brewing water can amount to 10 to 40 percent approximately, depending on which water-depth gauge 48 prevails in the supply reservoir 3.

If the water-depth gauge 48 in FIG. 1 is below the vertex 23, no brewing water at all flows through the line 16, that means the entire brewing water must pass the product 13 via said's upper surface 53. However, since in this case the extraction time, that means the time during which the product 13 is in contact with the brewing water, is still relatively short, undesirable materials are scarcely extracted from the product 13, or only to a limited extent.

When the main switch of the beverage brewing machine 1 is actuated in FIG. 2, water is heated in the continuous flow heater not illustrated in FIG. 2 and, due to the resultant formation of steam, is pumped upwardly in the feed pipe 36 until brewing water enters via the edge 49 of the feed pipe 36 into the main chamber 37. As is generally known, a continuous flow heater delivers brewing water in conformity with its heating power and the cross-section of its heated pipe in more or less rapid intervals so that brewing water spills abruptly over the upper edge 49. In the absence of a valve 47, a quantity of brewing water corresponding to the cross-section provided at the first outlet opening 41 flows out of the first outlet opening 41 onto the upper surface 53 of the product 13 disposed underneath.

Instead of the continuous flow heater not illustrated in FIG. 2, also the supply reservoir 3 together with valve 11 illustrated in FIG. 1 could be used for heating the brewing water, from which reservoir the entire brewing water could be supplied to the main chamber 37 after opening of the valve 11. In this case, the dimensioning of the two outlet openings 41, 43 and the size of the main and secondary chambers 37, 42 would have to be adapted to the suddenly starting continuous supply of brewing water.

The cross-section of the first outlet opening 41 according to FIG. 2 is dimensioned such that less brewing water dispenses than is introduced via the feed pipe 36. Consequently, the main chamber 37 fills slowly with brewing water until a brewing water level 50 is reached which corresponds to the upper edge 39 of the partition wall 40. Subsequently, brewing water enters via the upper edge 39 of the partition wall 40 into the secondary chamber 42, from where it propagates via the second outlet opening 43 into the collecting groove 26 of the brewing unit 2, and from there it flows along the other path 73 to the outlet opening 30, where it dispenses with the brew into the storing tank 31 placed underneath. It has already been explained hereinabove in the description of FIG. 1 how the introduction of the brewing water via the collecting groove 26 (FIGS. 2 to 4) onto the outside surface 63 of the paper filter 14 can cause further extraction of the ground coffee according to the present invention in the upper area 27 so that there is no need to describe it once more at this point. The filter unit 2 illustrated in FIGS. 3 and 4 can replace both the filter unit 2 shown in FIG. 1 and that in FIG. 2.

Caused by the great formation of steam during the delivery of the brewing water through the feed pipe 36, an excess pressure could result in the closed brewing tip 35, that means in the main and secondary chambers 37, 42, if the pipe 45 was not provided in the main chamber 37 which ends only above the water level 50, which penetrates the bottom 38 and is there connected to the atmosphere. This prevents the occurrence of a pressure increase in the main and secondary chambers 37, 42, since pressure impacts are dispensed via the pipe 45 directly to the atmosphere, an even discharge of brewing water out of the outlet openings 41, 43 being achieved in dependence on the water level as a result.

Advantageously, the exit of hot steam from the pipe 35 according to FIG. 2 is used to warm the product 13 and the brewing unit 2 within certain limits so that heat losses during the passage of the brewing water through the product 13 are partly compensated, and hence sufficiently hot coffee is supplied into the storing tank 31.

As can still be seen from FIG. 2, a baffle 51 which is provided with at least one aperture 52 rises from the bottom 38. The apertures 52 serve to develop an evenly high water level 50 on each the left and the right hand of the baffle 51 in the main chamber 37. The purpose of the baffle 51 itself is to collect brewing water which is injected at the upper edge 49 of the feed pipe 36 and to convey it into the main chamber 37 so that it is always safeguarded that brewing water flows into the secondary chamber 42 only if the brewing water level 50 is indeed on the level of the upper edge 39 of the partition wall 40.

We claim:

1. A beverage brewing machine comprising a reservoir for holding cold water, an electric heating unit which during operation heats the cold water to produce a brewing water, and a brewing unit, said brewing unit having a receiving chamber for receiving a filter insert into which product is placed, said filter insert having a water-permeable wall, said receiving chamber having an inflow passage which receives water and delivers the received water to the outside of the water-permeable wall when said filter insert is resting in said receiving chamber so that water flows through the sidewall into an upper portion of the product in the filter insert; wherein said reservoir includes a first water outlet through which a portion of the brewing water is delivered onto the top of the product in said filter insert, and wherein said reservoir includes a second water outlet through which another portion of the brewing water is delivered to said inflow passage and from there through the water permeable wall of the filter insert.

2. A beverage brewing machine as claimed in claim 1 in which a paper filter is used as the filter insert, and wherein the receiving chamber of the brewing unit has a bowl-shaped inner wall with an upper edge, and includes in the vicinity of the upper edge a spacer element projecting from the inner wall into the receiving chamber of the brewing unit, said receiving chamber of the brewing unit having dimensions which conform to the paper filter such that, during brewing action, the paper filter substantially abuts on the inner wall of the receiving chamber except in the area of the spacer element, whereby in the area of the spacer element a space is created between the inner wall of the receiving chamber and an outside surface of the paper filter through which the portion of the brewing water received in the inflow passage enters into the paper filter.

3. A beverage brewing machine as claimed in claim 2, wherein both the receiving chamber of the brewing unit and the paper filter are funnel-shaped.

4. A beverage brewing machine as claimed in claim 2, wherein the spacer element has such a shape that it forms jointly with the inner wall of the brewing unit a funnel for the brewing water which expands towards an inlet opening, and wherein the funnel contains an outlet opening directing the brewing water to the outside surface of the filter insert.

5. A beverage brewing machine as claimed in claim 4, wherein the inner wall of the brewing unit in the area of the funnel forms the inflow passage through which the brewing water is directed to the outlet opening.

6. A beverage brewing machine as claimed in claim 4, wherein the outlet opening at the funnel is formed by a slot which extends along a peripheral surface of the funnel.

7. A beverage brewing machine as claimed in claim 2, wherein the spacer element comprises a tape attached at its two ends to the inner wall of the brewing unit and forming with the inner wall of the brewing unit an opening for receiving the brewing water.

8. A beverage brewing machine as claimed in claim 2, wherein the inner wall of the brewing unit extends from the upper edge to a bottom area near an outlet opening through which extracted product passes and further comprising ribs on the inner wall extending from near the upper edge to the bottom area, said ribs having profile heights (p) decreasing from the bottom area towards the upper edge of the inner wall of the brewing unit in such a manner that an upper area of the inner wall is smooth.

9. A beverage brewing machine as claimed in claim 8, wherein the profile height (p) is approximately 1 millimeter in the area of the outlet opening and then reduces constantly in an upward direction.

* * * * *